Aug. 31, 1965 R. J. COFFELT ETAL 3,203,339
COLOR RELEASING MACHINE
Filed April 1, 1963 5 Sheets-Sheet 4
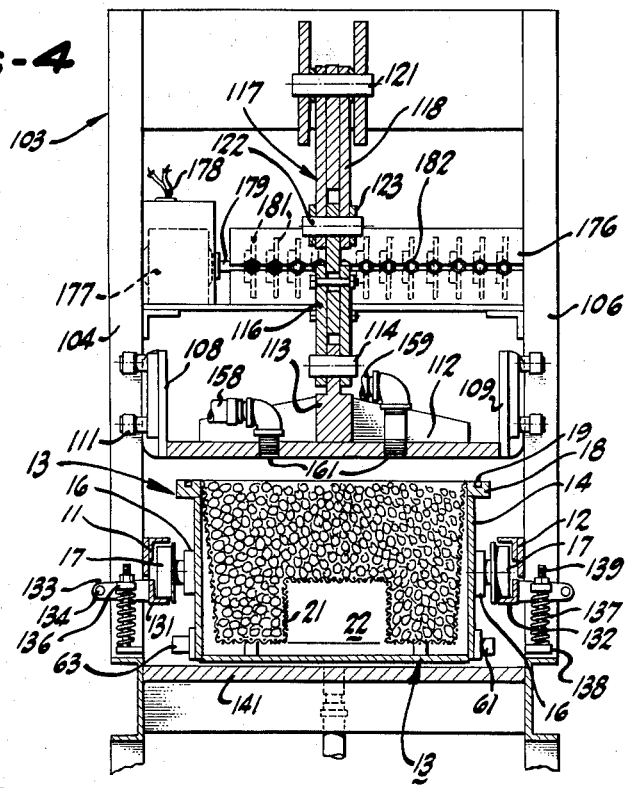
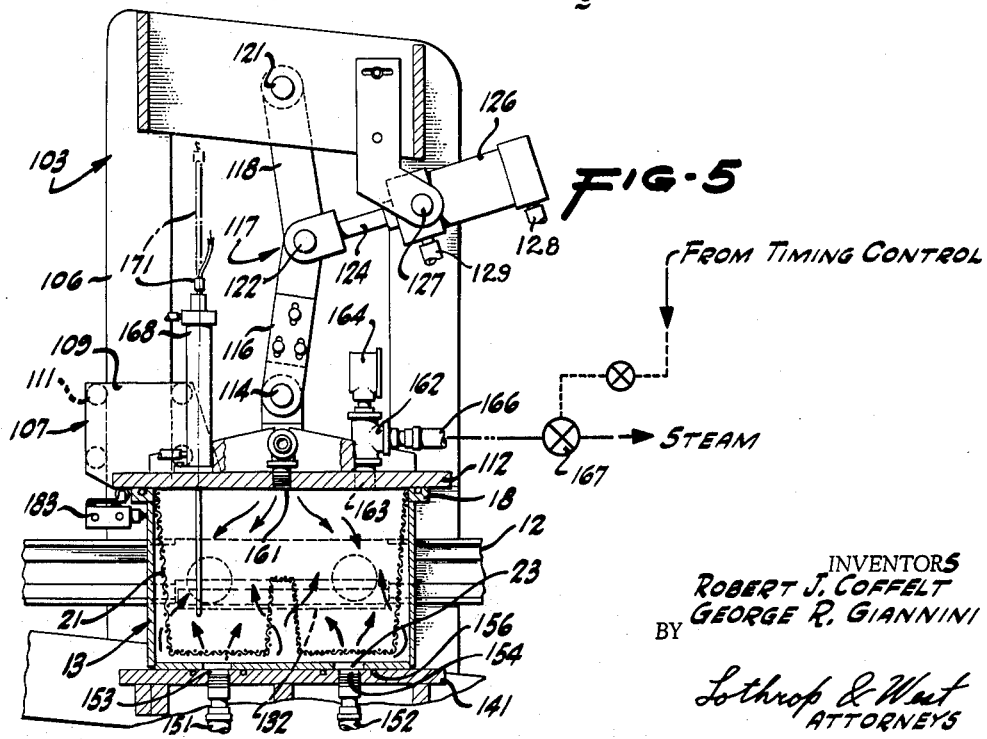
INVENTORS
ROBERT J. COFFELT
GEORGE R. GIANNINI
BY
Lothrop & West
ATTORNEYS

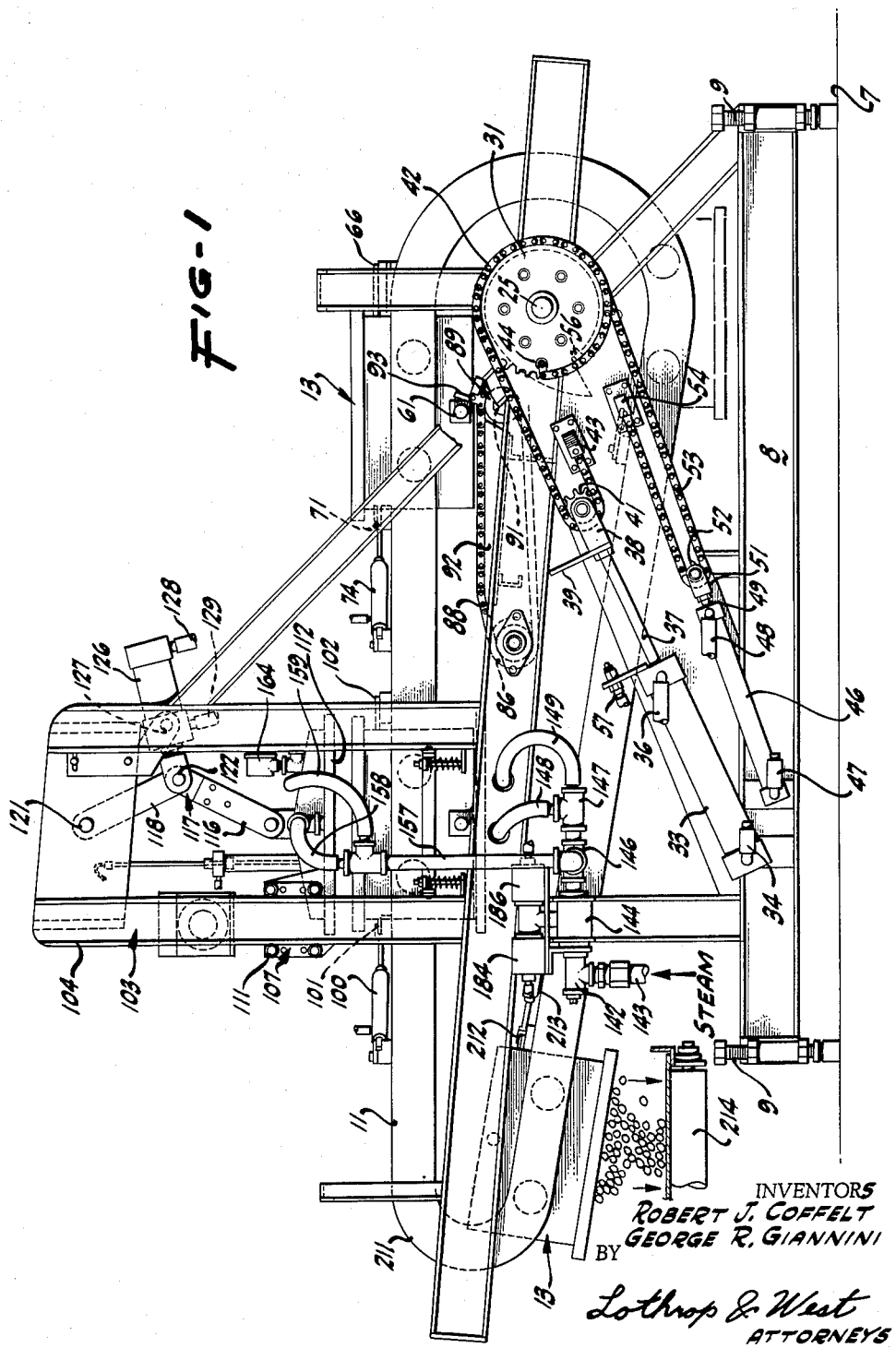

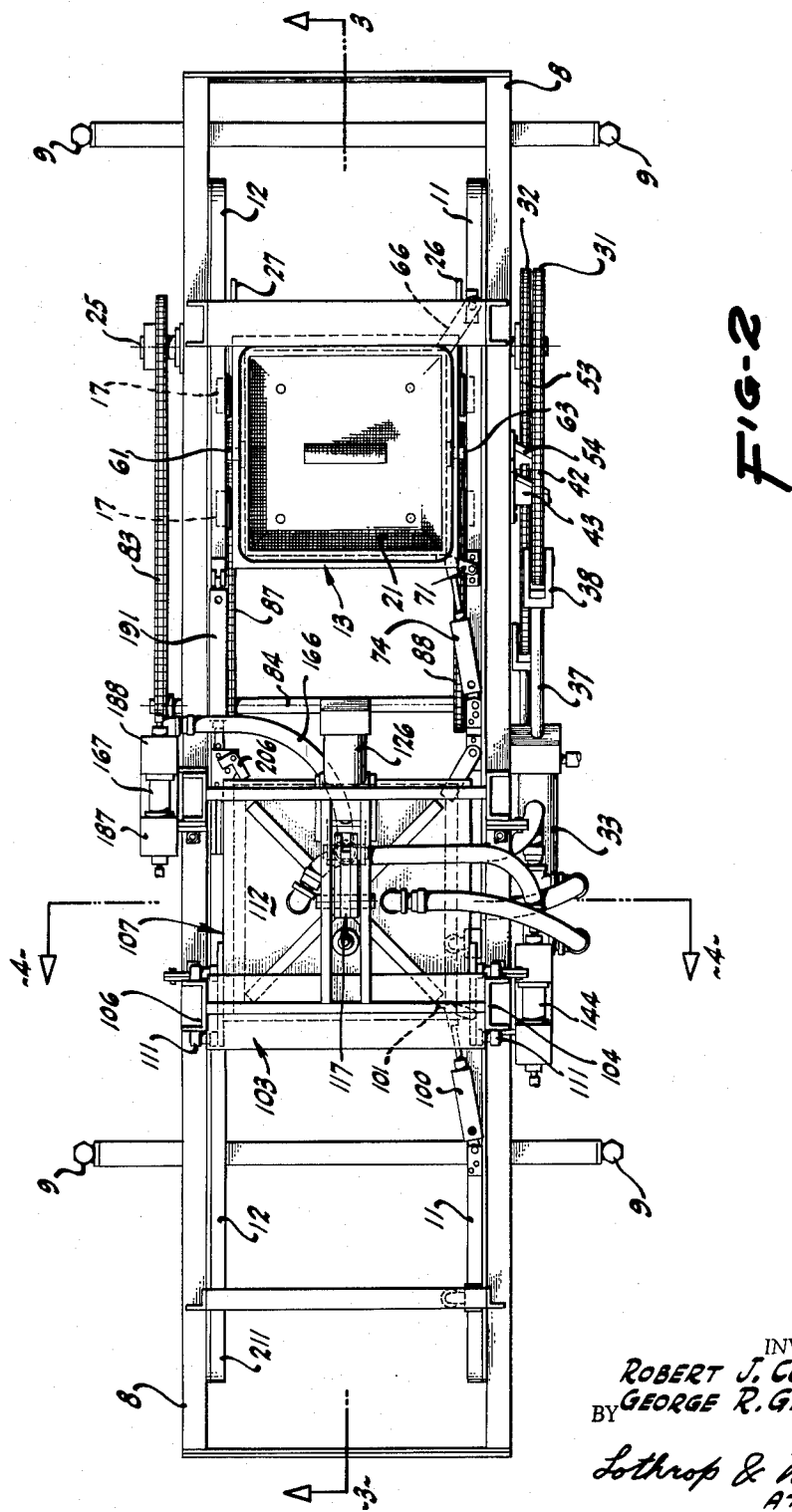

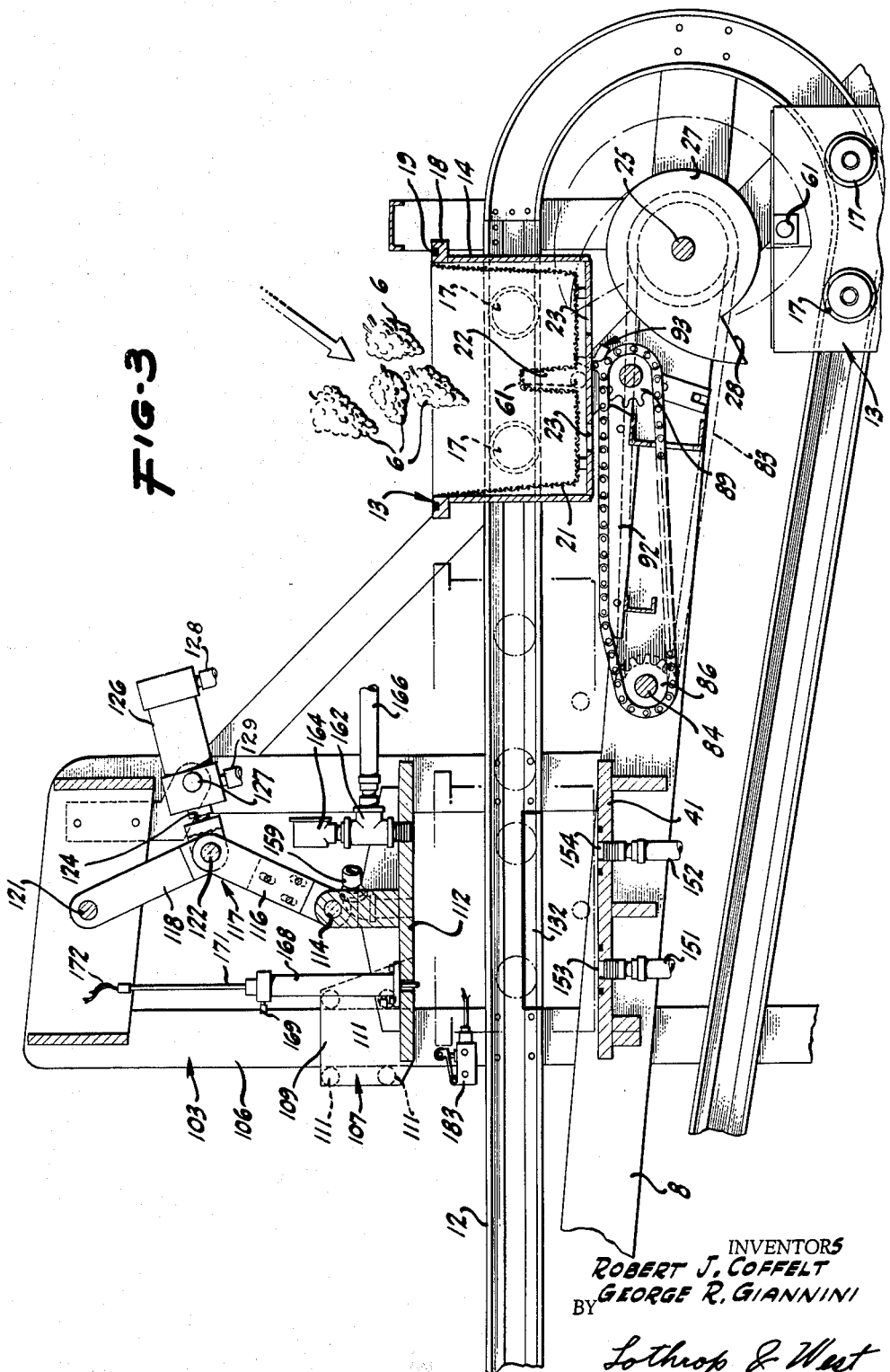

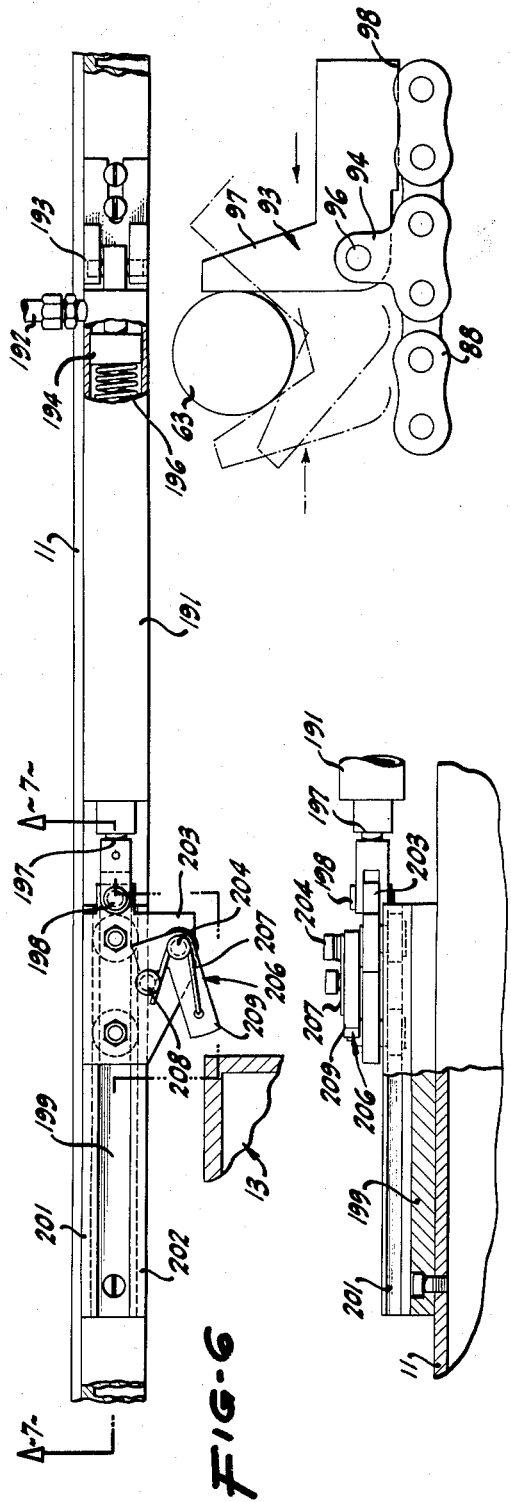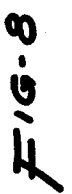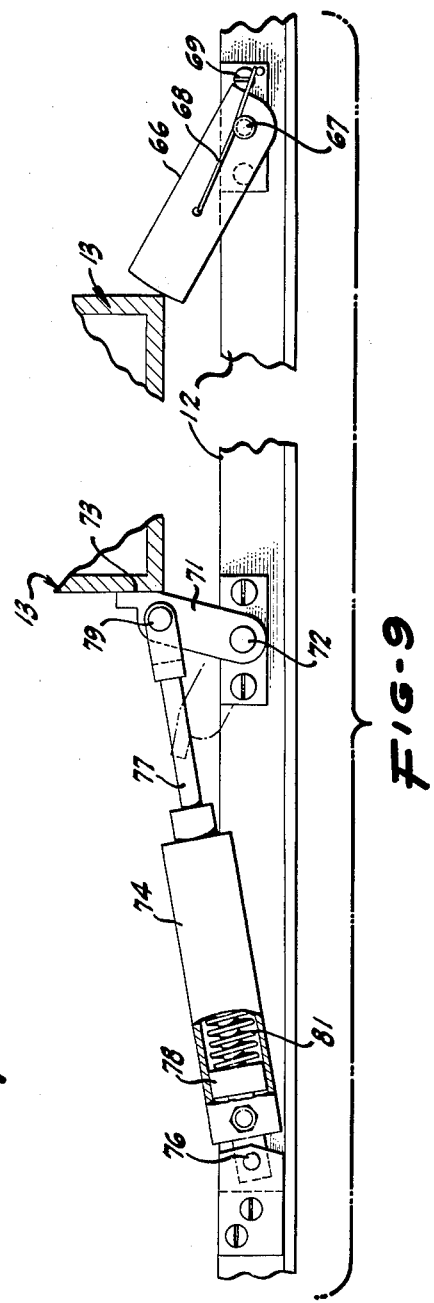

United States Patent Office 3,203,339
Patented Aug. 31, 1965

3,203,339
COLOR RELEASING MACHINE
Robert J. Coffelt and George R. Giannini, Davis, Calif., assignors to The Regents of the University of California, Berkeley, Calif.
Filed Apr. 1, 1963, Ser. No. 269,575
6 Claims. (Cl. 99—240)

Our invention relates to devices useful in treating materials such as fruits and vegetables in such a way that the color is quickly released from the treated material. While our machine is useful with a large number of different kinds of fruits and vegetables and even other commodities, it has been particularly arranged for use in connection with grapes, particularly wine grapes. At the present time, crushed wine grapes and their juices are put into vats as an initial stage of winemaking. Part of the vat processing is effective eventually to kill the color cells in the grapes so that the color is transferred to the surrounding juice. This process, while effective, takes a protracted time and involves the storage of a large amount of material. It has been found that if the grapes are treated for a limited time with material such as steam at an elevated temperature and pressure, the color cells are quickly killed without damage to the remainder of the grape or its juice and transfer quickly from the grape to the surrounding juice without any "cooked" taste, loss of flavor or other deleterious factors. There is consequently no necessity of storing grapes in vats for a protracted period, and the entire color transfer process is made substantially faster.

It is therefore an object of our invention to provide a color releasing machine effective to handle material such as grapes and to subject the grapes to a treatment for a selected time with steam or other heating material at an elevated temperature.

A still further object of the invention is to provide a color releasing machine effective to provide momentary and periodic treatment of materials such as grapes with an elevated temperature fluid medium effective to kill the color cells.

A still further object of the invention is to provide a color releasing machine which can handle a substantial quantity of grapes at a time, with the grapes being subjected to steam under considerable pressure for a limited period so as to kill the color cells in the grapes.

A still further object of the invention is to provide a machine for releasing color which is substantially automatic and controlled in its operation once it has been set into motion.

A still further object of the invention is to provide a color releasing machine which can readily be maintained, serviced and cleaned without substantial labor.

Another object of the invention is to provide an improved color releasing machine.

Other objects together with the foregoing are attained in the embodiment of the machine described in the accompanying description and illustrated in the accompanying drawings, in which:

FIGURE 1 is a side elevation of a color releasing machine constructed in accordance with our invention;

FIGURE 2 is a plan of the machine shown in FIGURE 1;

FIGURE 3 is a cross section to an enlarged scale, the plane of section being generally indicated by the line 3—3 of FIGURE 2;

FIGURE 4 is a detailed cross section to the same scale as FIGURE 3, the plane of section being indicated by the line 4—4 of FIGURE 2;

FIGURE 5 is a view in detail similar to FIGURE 3 showing the parts in an operating position and showing some of the parts in cross section on the same plane as the line 3—3 of FIGURE 2;

FIGURE 6 is a fragmentary view for the most part showing in plan part of the container impelling means, some parts being broken away to show the interior construction;

FIGURE 7 is a detail showing principally in side elevation a part of the mechanism of FIGURE 6, certain portions being broken away to disclose the construction in cross section;

FIGURE 8 is an enlarged detail showing in side elevation part of the container impelling mechanism; and FIGURE 9 is a composite view with portions broken away showing a part of the container retaining mechanism.

While our color releasing machine can be embodied in many different forms and in different sizes and capacities, depending upon the requirements and upon the materials to be worked with, it has successfully been incorporated in the manner shown herein for use on grapes, particularly wine grapes, supplied in bunches 6 as shown in FIGURE 3. The machine is designed for portable installation on a floor 7 and comprises a frame 8 made up of the customary channels, shapes and other parts to afford an appropriate support for the remainder of the mechanism. The frame 8 includes adjustable legs 9 so that the structure can be substantially levelled despite inclinations in the floor 7.

Appropriately disposed on and included in the frame 8 are tracks 11 and 12 (FIGURE 4), each of which is comprised particularly of facing channels disposed with their flanges affording a closed loop contour. The two track loops are in parallel vertical planes.

Adapted to be supported by and to run on the tracks 11 and 12 is a container 13. This is of rectangular form and is of a box-like configuration. The container has an outer metal shell 14 open at the top. The container has bosses 16 at the sides for wheels 17 to support the container 13 on the tracks for ready motion. The pairs of wheels 17 at opposite sides of the container ensure that the container follows the configuration of the track as the container is propelled in a closed circuit around the track.

Particularly for use in connection with grapes, the metal shell 14 is provided around its upper periphery with a reinforcing flange 18 carrying a pressure seal 19. The shell is equipped with a reticulated or screen liner 21 spaced somewhat from the interior of the shell 14 to afford a space 22 for the reception of a heating fluid.

In order that the heating fluid can readily be admitted, the container 13 at various predetermined points is provided with apertures 23 suitable in number and arrangement to afford ready flow. The configuration of the screen 21 is such that passage of the heating fluid from the apertures 23 into and through the contents of the screen is uniformly and promptly effectuated.

For convenience, several containers 13 are used. One of the empty containers 13 is conveniently stored, at least momentarily, in an inverted position as shown in FIGURE 3. Means are provided under the control of an operator for advancing a container from its lower stored station to an active position. Spanning an end portion of the frame 8 is a driven shaft 25 appropriately journalled. At an intermediate location, the shaft 25 has scroll cams 26 and 27 fastened thereon. Each of the cams 26 and 27 has a radial wall 28.

On the shaft 25 at one outboard end are mounted sprockets 31 and 32 (FIGURE 2). A feed cylinder 33 is mounted on the frame 8 in the plane of the feed sprocket 31. The cylinder 33 is operable by compressed air and has appropriate connections 34 and 36 for that purpose. Extending from the cylinder 33 is a piston rod 37 carrying a yoke 38 and carrying a finger 39. Mounted to revolve in the yoke is a sprocket 41 over which a drive chain 42 is trained. One end of the chain 42 is connected to the frame by an anchor 43, while the other end of the chain 42 after being trained partially around the feed sprocket 31 is connected to the sprocket itself by an anchor 44.

Somewhat similarly, but disposed primarily in the plane of the return sprocket 32, is a return cylinder 46 at one end fastened to the frame 8 and designed to be actuated by air under pressure controlled through connections 47 and 48. A piston rod 49 projecting from the cylinder 46 carries a yoke 51 in which a sprocket 52 is mounted to revolve. A return chain 53 at one end is firmly fixed on the frame by an anchor 54 and in addition to being trained around the sprocket 52 is also partially trained around the return sprocket 32 and is secured thereto by an anchor 56.

In the operation of this portion of the mechanism, when the user actuates an appropriate control (not shown), pneumatic pressure fluid is approximately supplied through the connection 36 to the cylinder 33 and the connections 47 and 48 of the cylinder 46 are in a neutral condition. The piston rod 37 is consequently drawn into the cylinder 33 and translates the yoke 38 toward the left in FIGURE 1. This advances the chain 42 and so rotates the sprocket 31. Simultaneously the sprocket 32 takes in the chain 53 and draws the piston rod 49 out of the cylinder 46. The sprocket motion rotates the cross shaft 25 until the finger 39 comes into contact with a control 57 mounted on the frame. When contacted, the control 57 changes the pneumatic connections so that the cylinder 46 is powered to restore the parts to their original position while the connections 34 and 36 are neutral. In this fashion the shaft 25 is given a rotation of a fixed amount less than a full rotation alternately in opposite directions, the extent of rotation being approximately 270°.

As the shaft 25 revolves, the cams 26 and 27 also revolve and cause the walls 28 to abut a circular projection 61 extending from one side of the container 13 and to abut a similar projection 63 on the other side of the container 13. The arrangement is such that the pneumatic mechanism when cyclically actuated advances the container from its inverted storage position as shown particularly in FIGURE 3 to an upright position on the top run of the facing tracks, and itself restores for a subsequent cycle.

Although the tips of the walls 28 of each of the cams 26 and 27 disengage from the projections 61 and 63 at appropriate times, there is nevertheless provided means for positively arresting and holding the container in a loading station on the upper run of the tracks. As particularly illustrated in FIGURE 2, as the container rounds the track from the lower run to the upper run thereof, it travels by a pawl 66 (FIGURES 2 and 9). The pawl is mounted on a pivot 67 on the framework and is impelled by a spring 68 to rest against a stop 69. The angle and length of the pawl are such that the container 13 can be moved past the pawl from right to left (in the figures), but as soon as the container has advanced sufficiently, the spring-pressed pawl moves immediately behind the corner of the container 13, thus preventing any retrograde movement.

To serve as a positioning stop for the container in a forward direction, there is also mounted on the frame (FIGURES 2 and 9) a special level 71 rotatable on a pivot 72 and having a flat arresting face 73. A pneumatic jack 74 is mounted on the frame by a pivot connection 76. A piston rod 77 extends from a piston 78 within the jack 74 to a pivot connection 79 with the lever 71. A spring 81 normally retracts the piston rod 77 into the cylinder and withdraws the lever 71. When air pressure is furnished behind the piston 78, the spring 81 is overcome and the lever 71 is put into its obstructing position as shown in FIGURE 9.

As the container 13 is impelled by the walls 28 of the two cams 26 and 27 toward and into the loading station, the container snaps past the pawl 66, which prevents backward movement and at the same time abuts against the erected lever 71 which establishes its position and holds it against further forward movement. The container is thus situated at the loading station with its open portion uppermost; that is, in an upright position. In this location, appropriate material, such as bunches of grapes 6, is loaded into the container to rest against the screen 21.

When the container has been entirely filled or sufficiently filled for the operator's purpose, he again actuates the control govering the feed and return cylinders 33 and 46. These cylinders again cycle to rotate the shaft 25 in a counterclockwise direction as seen in FIGURES 1 and 3. The second actuation by the operator of the controls for the cylinders 33 and 46 repeats the operation of the shaft 25 and also puts certain other mechanism into motion.

At its far end (FIGURE 2), the shaft 25 drives a chain 83 connected to a cross drive shaft 84 journalled in the frame. The shaft 84 carries sprockets 86 around which chains 87 and 88 are trained. These chains are also engaged with sprockets 89 on a lay shaft 91 appropriately journalled in the frame and are disposed between the side rails. Cooperating with the upper run of each of the chains 87 and 88 are cams 92 supported on the frame and serving to hold the upper runs of the chains in a generally horizontal plane.

The chains 87 and 88 are provided with special lugs 93 as particularly shown in FIGURE 8. An appropriate one of the chain links has upstanding portions 94 in which a pivot pin 96 is situated for engagement with the lug 93. The lug has an arm 97 in a position to engage with the adjacent one of the projections 61 or 63 on the sides of the container 13. The arm 97 is held against retrograde movement by a block 98 forming part of the lug and designed to lie against a succeeding link in the chain 87 or 88. Thus when the chains advance, the upstanding arms 97 contact the projections 61 and 63 and correspondingly advance the container 13. When the chains operate in the opposite direction, the arms 97 swing freely under the projection 61 or 63 and the weight of the blocks 98 restores the lugs 93 to original position.

Since the chains 87 and 88 operate in synchronism with the cams 26 and 27, the effect is for the lugs 93 to engage immediately with the container 13 when the shaft 25 turns and to advance the container from the loading station. Just prior to the actuation of the feed cylinder 33, the jack 74 is relieved of air pressure and is spring-retracted so that the positioning lever 71 is withdrawn. The second depression of the start button by the operator moves the container 13 from the loading station forwardly toward a treating station. The container travels smoothly on the rails 11 and 12 until it approaches a treating station. A cylinder 100 is disposed on the frame 8 and has a construction substantially as shown in FIGURE 9. The cylinder 100 actuates a stop 101 for the forward motion of the container at the treating station. Also of a construction like that shown in FIGURE 9, a pawl 102 is suitably mounted on the main frame so that retrograde movement of the container is prevented and the container is thus accurately held at the treating station.

Extending upwardly from the frame 8 and forming part of it at the treating station is a superstructure 103 comprised of appropriate shapes and including channels 104 and 106 serving as vertical tracks for a carriage 107. This includes upstanding blocks 108 and 109 provided with rollers 111 engaging opposite sides of the tracks so that the carriage can move only vertically. Included in the carriage is a cover 112 of sufficient extent to enclose or overlie the usually uncovered container 13. The cover 112 acts as a bridge between the blocks 108 and 109 so that they all move as one unit. Since the upper surface of the container is substantially planar, except for a slight projection of the sealing means 19, and since the lower surface of the cover is likewise planar, the cover when in position acts to close and seal the container.

The cover is provided with a central projection 113 through which a pivot pin 114 passes. The pivot pin joins the cover to one arm 116 of a toggle 117 including a second arm 118. One end of the arm 118 is connected to the superstructure 103 by a cross pin 121. The two toggle arms 116 and 118 are connected together by a toggle pin 122. Also connected with the pin 122 is a yoke 123 on the end of the piston rod 124 of a jack mechanism 126. Pins 127 mount the jack 126 for rocking movement in the superstructure 103.

The jack 126 is actuated by pneumatic fluid passing through flexible connections 128 and 129 from a suitable source so that when the piston rod 124 of the jack 126 is retracted the toggle 117 is broken and the cover 112 is raised. When the piston rod of the jack is extended, the toggle 117 moves toward straight position and the cover 112 is translated vertically downwardly toward the container 13. In fact, the movement of the toggle is so arranged that the cover 112 abuts the container and presses tightly against it so as to seal the container sufficiently to withstand a relatively high interior pressure; that is, a pressure in excess of atmospheric.

In order to take care of various irregularities in the size of successive containers and various irregularities in the motion of the linkages, yet to have an effective seal in all cases, the tracks 11 and 12 are particularly fabricated in the vicinity of the treating station.

As particularly shown in FIGURES 1 and 4, a short section of each track adjacent the treating station is specially formed. The lower flanges of the normal chanels are removed for an interval and are replaced by angles 131 and 132, each of which is mounted on appropriate levers 133 conected to the superstructure 103 by pivot rods 134. The levers 133 are provided with bosses 136 bearing upon helical springs 137 resting on projections 138 on the frame 8. Central rods 139 and nuts serve as spring guides and stops. As the toggle 117 moves toward straight positions, the cover 112 is lowered into abutment with the container 13. As the toggle motion continues, the container itself and the track angles 131 and 132 are depressed against the urgency of the springs 137.

Advantage is taken of the downward movement of the container to assure a tight interconnection between a source of treating fluid for the contents of the container and the container itself. Arranged between the side members of the frame 8 is a platen or base plate 141 firmly fixed in position and having an upper surface which is planar.

While various different fluids may be employed as treating agents for the contents of the container, it is preferred in the case of grapes to utilize steam which is nearly dry and saturated. This is because it is desired to subject the grapes to a set temperature for a limited period of time. The temperature of dry and saturated steam is well and easily regulated by controlling the pressure of the steam.

A supply fitting 142 on the frame 8 is connected to a steam source (not shown) by a flexible hose 143 and leads through a valve 144 to fittings 146 and 147. From the fitting 147 flexible hoses 148 and 149 extend through the side walls of the framework to connections (FIGURE 5) 151 and 152 leading to openings 153 in the platen 141. These openings are surrounded by sealing rings 156 and are so positioned as to register with the apertures 23 provided in the bottom of the container 13. While normally the sealing rings 156 project slightly above the upper face of the platen 141, they are somewhat compressed to form a tight seal when the toggle 117 is substantially straightened.

There is also a supply of treating fluid, such as steam, to the upper portion of the container. For that reason, the fitting 146 has an extension 157 leading to flexible hoses 158 and 159 going to apertures 161 in the cover plate. In effect, the container 13 is clamped between the cover 112 and the platen 141 and a tight seal is made. With this arrangement when the valve 144 is opened, saturated steam is supplied to the interior of the container from the top and from the bottom.

Pressure is released from the container at the end of an appropriately timed treating cycle. A fitting 162 opening through an aperture 163 into the container 13 carries a gauge 164 and connects through a flexible hose 166 to a valve 167 leading under appropriate control to the atmosphere. Thus by controlling the valves 144 and 167 the interior of the container can be subjected to steam under the desired pressure or can be subjected merely to atmospheric pressure.

During the time that the contents of the container are being treated at the treatment station, it is often advantageous to measure the temperature thereof. For that reason there is mounted on the cover 112 (FIGURE 3) a cylinder 168 having a piston therein (not shown) actuated by pneumatic fluid through appropriate connections 169. A probe 171 is operated by the piston within the cylinder 168 and carries leads 172 extending to a suitable meter. When the piston of the cylinder 168 is actuated, the probe 171 is plunged from its retracted position substantially within the cover 112 downwardly into the mass of material within the container 13. The probe is usually extended downwardly just after the cover has been positioned and is withdrawn at the end of the treatment period.

To establish the desired duration of treatment, or the times between which the saturated steam is admitted to the container and is discharged therefrom, a timing mechanism 176 is provided. This is located on the superstructure 103 and controls a number of the instrumentalities on the machine. The timing mechanism includes an electric driving motor 177 (FIGURE 4) supplied through leads 178 and effective when operating to revolve a shaft 179 having a series of cams 181 thereon. Each of the cams is effective upon an appropriate control line 182, preferably electric, so that the various controls are timed pursuant to the rotation of the shaft 179.

Normally, the motor 177 is de-energized and is stationary, but the descending cover 112 engages a main switch 183 (FIGURE 5) and closes a circuit through the leads 178 to energize and rotate the motor 177. The timed sequence then begins. The appropriate control lines 182 thus actuate the control members 184 and 186 (FIGURE 1) for the steam inlet valve 144 and similar control members 187 and 188 for the atmospheric exhaust valve 167. Additional control lines 182 govern the connections 169 to the probe cylinder 168. One of the cams 181 acting through an appropriate one of the control lines 182 at the end of a predetermined period of rotation of the motor 177 is effective to reverse the pressure in the toggle cylinder 126 and restores the motor 177 to its initial position and de-energized condition.

When reversed, the cylinder breaks the toggle 117 and lifts the cover 112 shortly after the stream supply has been interrupted and the interior of the container has again connected to atmosphere. The rising cover releases the master switch 183, and this portion of the structure is in condition for a subsequent operation.

The container is next advanced from the treating position to a subsequent, discharge position. For that reason, as one of the control operations at the end of the treatment period, the cylinder 100 is operated to retract its pawl lever so that there is no longer a barrier to the advancement of the container. Also, a propelling cylinder 191 (FIGURE 6) is appropriately energized through a pressure line 192. The cylinder 191 is connected at one end to a side rail of the frame 8.

Operating within the cylinder is a piston 194 ordinarily pressed by a spring 196 toward retracted position. The piston 194 is connected to a piston rod 197 joined by a pin 198 to a slide 199 constrained to rectilinear translation on the frame by guide bars 201 and 202. The slide 199 has an extension 203 from which projects a pivot pin 204. A bell crank 206 is journalled on the pin 204 and is urged by a grasshopper spring 207 against a stop 208 on the extension 203. The projecting arm 209 of the lever 206 is so disposed as to abut a rear corner of the container 13 when the container is in the treating station.

When pressure is exerted on the piston 194 by pneumatic fluid entering through the line 192, the slide 199 is advanced, carrying the bell crank 206 with it. The arm 209 then abuts the rear corner of the container and advances the container away from the treating station along the channel tracks 11 and 12 toward their arcuate portions 211. The operation of the cylinder 191 affords sufficient impetus to the carriage leaving the treating station to send the carriage around the arcuate portions 211 and to invert.

The travelling container is halted against a stop member 212 like the lever 71 and operated by a cylinder 213. The inverted container is therefore held at a discharging station immediately above a receiver 214 such as a conveyor belt. The inversion and abrupt stop of the container are sufficient to release and to jar loose the treated contents thereof and to leave the container empty and subject to further use. The conveyor 214 carries away the discharged material. At an appropriate time the cylinder 213 is reversed to retract the stop 212.

The container at the discharging station when so released travels by gravity on the downwardly inclined portions of the rails or channels and finally comes to rest substantially at the initial position shown in FIGURES 1 and 3. The container is then engaged for subsequent use upon a subsequent cycle of the shaft 25. It is possible to arrange the timing mechanism 176 so that the machine will operate continuously. For explanation herein, it is considered that the initiation of each cycle of operation of the machine is under the supervision or manual control of a user.

In the operation of this structure, material to be treated (especially to have the color cells therein killed so that they will release their color) is carried from a loading station into a treating station. There the material is subjected to a super-atmospheric pressure and an elevated temperature for a variable, controlled time. The material is then released from the container and discharged and the container is positioned for reuse. The arrangement is such that the container, while normally open, is temporarily covered and sealed from the atmosphere so that the internal pressure can readily be raised a substantial amount to provide the corresponding temperature.

What is claimed is:

1. A color releasing machine comprising a frame, a closed loop track having a horizontal run, means for mounting said track on said frame, a horizontal platen fixed on said frame below said run, means defining a fluid opening in said platen, means for mounting a section of said track run for vertical movement, an open top container having a bottom with an aperture therein, means for advancing said container on said track to said movable section with said aperture and said opening substantially in registry, a cover for said container, means for mounting said cover on said frame above said container on said movable section and for vertical movement toward and away from said platen, means on said frame for lowering said cover onto said container on said movable section and said container onto said platen, and means on said frame for supplying heating fluid to said container through said fluid opening.

2. A color releasing machine as in claim 1 and including springs for urging said track section upwardly.

3. A color releasing machine as in claim 1 and including a yielding sealing ring around said fluid opening and including a toggle linkage in said means mounting said cover on said frame and adapted to compress said sealing ring.

4. A color releasing machine as in claim 1 and including a toggle linkage in said means mounting said cover on said frame, said toggle linkage being movable substantially into locked position when said container is closest to said platen.

5. A color releasing machine as in claim 1 including a plurality of said containers on said track and in which said advancing means advances said containers separately.

6. A color releasing machine as in claim 1 including means defining an aperture in said cover and means on said frame for supplying heating fluid to said container through said aperture in said cover.

References Cited by the Examiner

UNITED STATES PATENTS

| 2,080,745 | 5/37 | Roche | 134—143 |
| 2,520,719 | 8/50 | Hanson | 99—360 |
| 2,640,444 | 6/53 | Reget | 214—311 X |
| 3,006,269 | 10/61 | Bradet et al. | 99—237 |

FOREIGN PATENTS

| 229,388 | 7/57 | Australia. |
| 939,371 | 4/48 | France. |

ROBERT E. PULFREY, *Primary Examiner.*

JEROME SCHNALL, *Examiner.*